(12) United States Patent
Lueders et al.

(10) Patent No.: US 9,991,794 B2
(45) Date of Patent: Jun. 5, 2018

(54) HYBRID CAPACITIVE-INDUCTIVE VOLTAGE CONVERTER

(71) Applicant: TEXAS INSTRUMENTS INCORPORATED, Dallas, TX (US)

(72) Inventors: Michael Lueders, Munich (DE); Erich Bayer, Thonhausen (DE); Thomas Schaeffner, Eching (DE); Giacomo Calabrese, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

(21) Appl. No.: 15/077,080

(22) Filed: Mar. 22, 2016

(65) Prior Publication Data

US 2017/0279354 A1    Sep. 28, 2017

(51) Int. Cl.
*H02M 3/158*    (2006.01)

(52) U.S. Cl.
CPC .................................. *H02M 3/158* (2013.01)

(58) Field of Classification Search
None
See application file for complete search history.

(56) References Cited

U.S. PATENT DOCUMENTS

| 7,397,677 B1 * | 7/2008 | Collins | H02M 3/07 323/271 |
| 8,391,038 B2 * | 3/2013 | Zacharias | H02J 3/38 363/132 |
| 9,166,476 B2 * | 10/2015 | Harada | H02M 3/156 |
| 2007/0104304 A1 * | 5/2007 | Takahashi | H02M 3/1588 375/375 |
| 2012/0139512 A1 * | 6/2012 | Usui | H02M 3/155 323/271 |

OTHER PUBLICATIONS

Cooke, "Analysis of a Voltage Controlled Frequency Foldback Technique that Improves Short Circuit Protection for Buck Derived Converters", Telecommunications Energy Conference (IEEE, 1996), pp. 749-755.

(Continued)

*Primary Examiner* — Jeffrey Gblende
(74) *Attorney, Agent, or Firm* — Michael A. Davis, Jr.; Charles A. Brill; Frank D. Cimino

(57) ABSTRACT

An inverting buck voltage converter constructed of a switched-mode hybrid topology, with a capacitive input stage and an inductive output stage. The input stage operates as a charge pump to charge a flying capacitor connected in series with an inductor in the output stage. Clock circuitry generates first and second non-overlapping clock phases. In the second clock phase, the flying capacitor is charged to the input voltage, with a flying node between the flying capacitor and the output inductor connected at ground through a rectifier, while in the first clock phase, the flying capacitor supports the inductor current. The arrangement of the flying capacitor and inductor is such that the voltage appearing at the output terminal is inverted from the input voltage. Continuous output current is provided. Current limiting techniques protect the flying capacitor from overcurrent conditions.

15 Claims, 9 Drawing Sheets

(56) References Cited

OTHER PUBLICATIONS

Cuk et al., "A New Optimum Topology Switching DC-to-DC Converter," Power Electronics Specialists Conference (IEEE, 1977), pp. 160-179.

Meyer et al., "Providing Continuous Gate Drive Using a Charge Pump", Application Report SLVA444 (Texas Instruments Incorporated, 2011).

"TPS54240 3.5-V to 42-V Step-Down DC-DC Converter with Eco-Mode", Data Sheet SLVSAA6B (Texas Instruments Incorporated, 2014).

* cited by examiner

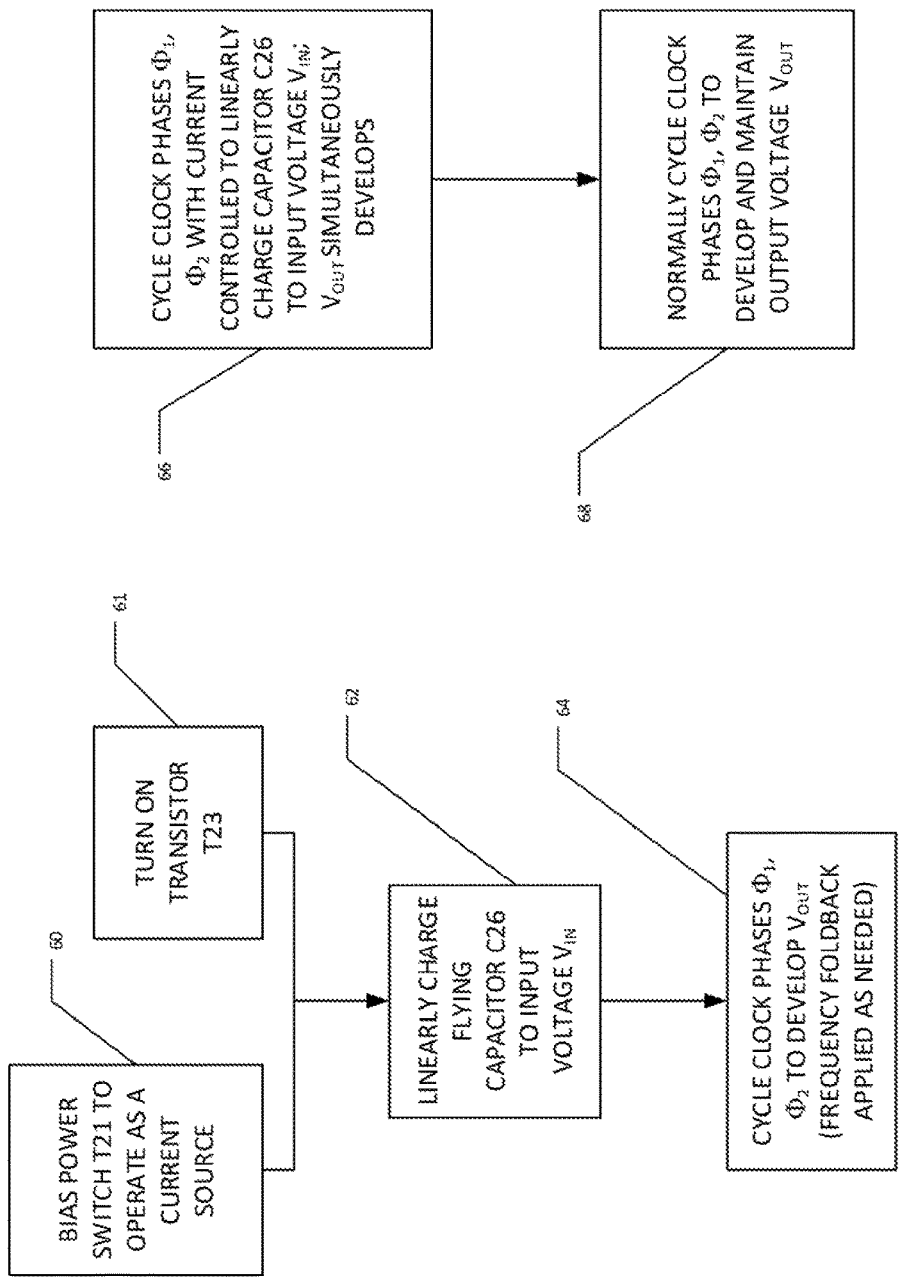

US 9,991,794 B2

HYBRID CAPACITIVE-INDUCTIVE VOLTAGE CONVERTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of voltage converters. Embodiments are more specifically directed to switched mode DC-DC voltage converter circuits.

Many electronic circuits and systems require the application of a negative DC voltage to one or more circuit nodes. For example, a negative bias may be required by certain component types, as a necessary power supply voltage to particular output devices such as displays, or to increase the performance and dynamic range of analog circuits. However, because most modern electronic devices rely on only a single, positive polarity, external DC power supply voltage, circuitry must be provided within these systems to generate a negative DC voltage from the positive external power supply voltage. Several architectures, or topologies, for DC-DC voltage converters that produce negative voltages are well-known in the art.

FIG. 1a illustrates one conventional voltage converter topology, in the form of the well-known inverting buck-boost converter. This circuit generates a negative polarity output voltage $V_{OUT}$ from a positive polarity input voltage $V_{IN}$. Input voltage $V_{IN}$ is provided at the drain of n-channel metal-oxide-semiconductor (MOS) transistor T1, which has its source connected to the drain of n-channel MOS transistor T2 and to one end of inductor L, the other end of which is at ground. The output voltage $V_{OUT}$ appears across output capacitor $C_{OUT}$, at the source of transistor T2. Clock generator 2 generates complementary (typically non-overlapping) clock phases $\Phi_A$ and $\Phi_B$ over a periodic sequence of clock cycles. These clock phases $\Phi_A$ and $\Phi_B$ are applied to the gates of transistors T1 and T2, respectively. In operation during phase $\Phi_A$, transistor T1 is on, conducting current $I_L$ from input voltage $V_{IN}$ through inductor L, which develops a voltage $V_L=V_A$ across inductor L. The inductor voltage $V_L$ corresponds to input voltage $V_{IN}$ minus the drain-to-source voltage drop across transistor T1. Transistor T2 is on during phase $\Phi_B$, and conducts a current $I_B$ equal to inductor current $I_L$, pulling output voltage $V_{OUT}$ negative. Output capacitor $C_{OUT}$ serves as a low-pass filter to stabilize output voltage $V_{OUT}$ at a voltage corresponding to the duty cycle D of phase $\Phi_A$:

$$V_{OUT} = -V_{IN}\left(\frac{D}{1-D}\right)$$

According to the inverting buck-boost converter of FIG. 1a, inductor L serves as the energy storage element, in that its inductor current $I_L$ operates to transfer energy from the input side of the circuit (transistor T1) to the output side (current $I_B$, which is the sum of load current $I_{LOAD}$ and discharge current from capacitor $C_{OUT}$).

While the inverting buck-boost topology presents an output voltage $V_{OUT}$ of a magnitude that can be either greater or smaller than that of input voltage $V_{IN}$, it presents certain drawbacks and limitations that are undesirable in many applications. One such drawback is that both the input current and the output current are discontinuous, conducting in one clock phase but not in the other, which is reflected in relatively high output voltage ripple and relatively high induced noise in the system. The amplitude of the inductor current $I_L$ is also relatively high, and has relatively high ripple from phase to phase. Transistors T1 and T2 must be constructed to withstand voltages as high as $V_{IN}+|V_{OUT}|$, necessitating these devices to be relatively large. The transfer function of the inverting buck-boost circuit of FIG. 1a also includes a right-half-plane (RHP) zero, indicating relatively slow transient response.

Another conventional DC-DC voltage converter type is referred to in the art as the Ćuk converter, an example of which is shown in FIG. 1b. This inverting voltage converter includes an inductor L1, a capacitor $C_F$, and another inductor L2, connected in series between the input and output terminals. N-channel MOS transistor T11 has its drain at node N1 between inductor L1 and capacitor $C_F$ and its source at ground; similarly, n-channel MOS transistor T12 has its drain at node N2 between capacitor $C_F$ and inductor L2 and its source at ground. The gates of transistors T11, T12 receive non-overlapping clock phases $\Phi_A$ and $\Phi_B$, respectively, from a clock generator (not shown in FIG. 1b). In operation, transistor T11 is on and transistor T12 is off during phase $\Phi_A$. Inductor current $I_{L1}$ through inductor L1 conducts through transistor T11 to ground, while inductor current $I_{L2}$ through inductor L2 charges capacitor $C_F$ (via current $I_{FA}=I_{L2}$). Inductor current $I_{L2}$ is sourced by load current $I_{LOAD}$ from the output terminal, and output capacitor $C_{OUT}$ stabilizes the output voltage $V_{OUT}$ at this terminal. Conversely in phase $\Phi_B$, transistor T11 is off and transistor T12 is on, so that current $I_{L1}$ of inductor L1 charges capacitor $C_F$ in the opposite direction ($I_{FB}=I_{L1}$), and current $I_{L2}$ through inductor L2 is conducted to ground through transistor T12. This "see-saw" action operates to transfer charge from the input (inductor L1) to the output (inductor L2), in that node N1 is pulled down and node N2 is pulled up during phase $\Phi_A$, and node N1 is pulled up and node N2 is pulled down during phase $\Phi_B$. The DC transfer function of this Ćuk converter is the same as that of the buck-boost converter, and is similarly dependent on the duty cycle D of phase $\Phi_A$:

$$V_{OUT} = -V_{IN}\left(\frac{D}{1-D}\right)$$

Similarly as the inverting buck-boost topology, the Ćuk converter can produce a negative output voltage $V_{OUT}$ at a magnitude either greater or smaller than that of input voltage $V_{IN}$. The Ćuk converter operates with both a continuous input current and a continuous output current, greatly reducing ripple in the output voltage $V_{OUT}$ and reducing the switching noise, as compared with the buck-boost converter. However, this topology requires two inductors (or, alternatively, a coupled inductor), which adds cost to the system. And like the inverting buck-boost topology, transistors T11 and T12 must be high voltage devices (rated to $V_{IN}+|V_{OUT}|$). The transient response of this topology is also relatively slow, because of two RHP zeroes in its transfer function.

As a result, conventional inverting voltage converter topologies do not completely satisfy the need, in some modern system applications, for the generation of a negative output voltage with low ripple and fast transient response. Conventional voltage converters therefore typically include a dedicated post-regulator, such as a negative low-drop-out (LDO) regulator, which reduces the conversion efficiency and also adds to the cost of implementing the voltage conversion function.

BRIEF SUMMARY OF THE INVENTION

Disclosed embodiments provide a DC-DC voltage converter topology that generates an output voltage with continuous output current, and thus minimal ripple.

Disclosed embodiments provide such a voltage converter topology with high control bandwidth, and thus rapid transient response.

Disclosed embodiments provide such a voltage converter topology suitable for producing a negative output voltage (i.e., of opposite polarity as the input voltage).

Disclosed embodiments provide such a voltage converter topology that may be implemented with a single inductor.

Disclosed embodiments provide such a voltage converter topology that may be implemented with transistors of relatively low voltage rating, and thus with reduced chip area.

Other objects and advantages of the disclosed embodiments will be apparent to those of ordinary skill in the art having reference to the following specification together with its drawings.

According to certain embodiments, a switched-mode voltage converter is provided for generating a negative polarity voltage from an input voltage. The voltage converter includes a capacitive input stage and an inductive output stage. The input stage operates as an inverting charge pump to charge a flying capacitor to the input voltage; an inductor is connected in series with the flying capacitor to the output terminal. Clock circuitry generates first and second non-overlapping clock phases of a clock period. In the second phase, the flying capacitor is charged from the input voltage while the inductor current is conducted to ground through a rectifier; in the first phase, the inductor current is supported by the flying capacitor.

BRIEF DESCRIPTION OF THE SEVERAL VIEWS OF THE DRAWING

FIG. 3b is a timing diagram illustrating an example of the clock phases applied to the inverting buck voltage converter of FIG. 3a.

FIGS. 6a and 6b are flow diagrams illustrating methods of starting up an inverting buck voltage converter, according to alternative embodiments.

DETAILED DESCRIPTION OF THE INVENTION

The one or more embodiments described in this specification are implemented into a voltage converter of the inverting buck type suitable for implementation in an integrated circuit, as it is contemplated that such implementation is particularly advantageous in that context. However, it is also contemplated that concepts of this invention may be beneficially applied to other applications, for example as implemented as a discrete circuit. Accordingly, it is to be understood that the following description is provided by way of example only, and is not intended to limit the true scope of this invention as claimed.

Attributes of switched-mode DC voltage converters that are desirable in many system implementations include low ripple in the output DC voltage, and rapid transient response of the converter to changes in the desired output voltage. Examples of applications that require these attributes of negative polarity DC voltages include high-performance analog circuits such as high-speed analog-to-digital and digital-to-analog converters (ADCs and DACs), heterojunction semiconductor devices such as gallium nitride transistors used in RF power amplifiers, and active matrix OLED and LCD graphics displays. As described above, conventional inverting DC voltage converters, such as the inverting buck-boost converter and the Ćuk converter, cannot fully meet these requirements, such that an additional LDO regulator stage is often required to condition the negative DC voltage generated by these converters. Certain embodiments described in this specification overcome these limitations, by providing a negative DC voltage with low ripple and with rapid transient response, as will now be described.

Figure 1A:
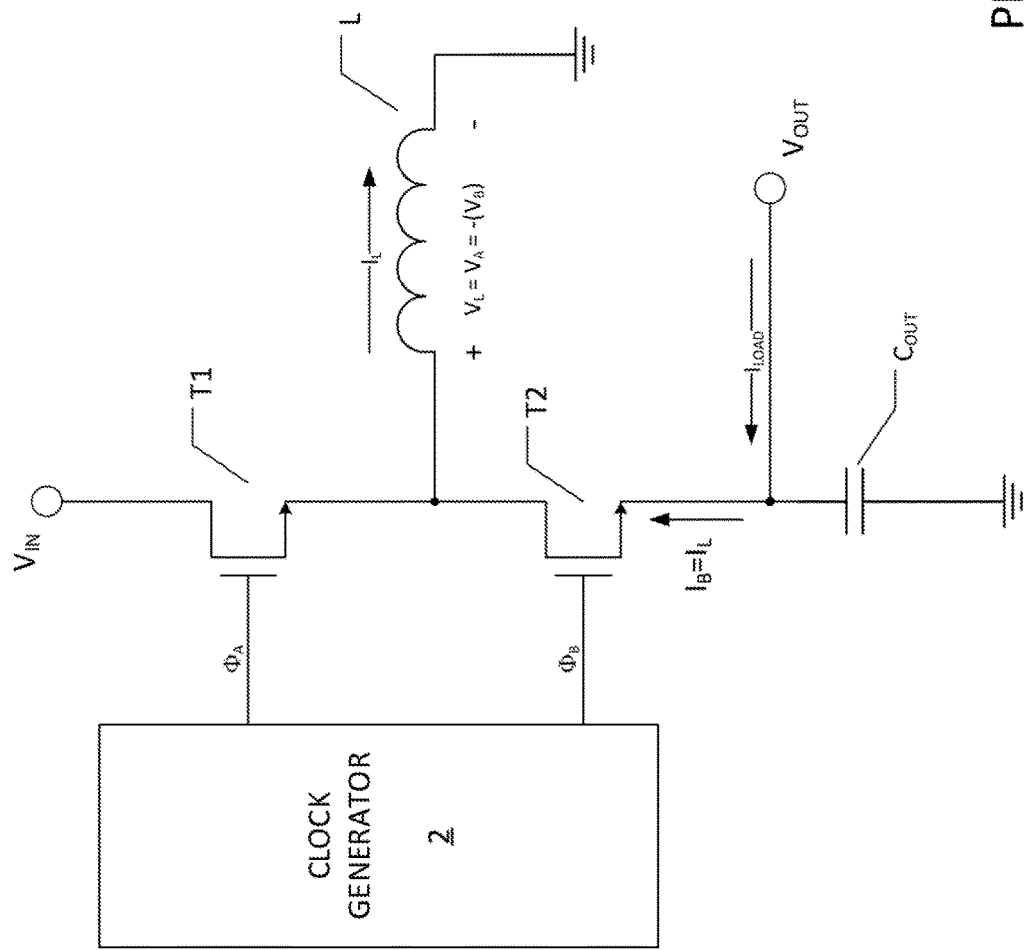
FIG. 1a is an electrical diagram, in schematic form, of a conventional inverting buck-boost voltage converter.
Figure 1B:
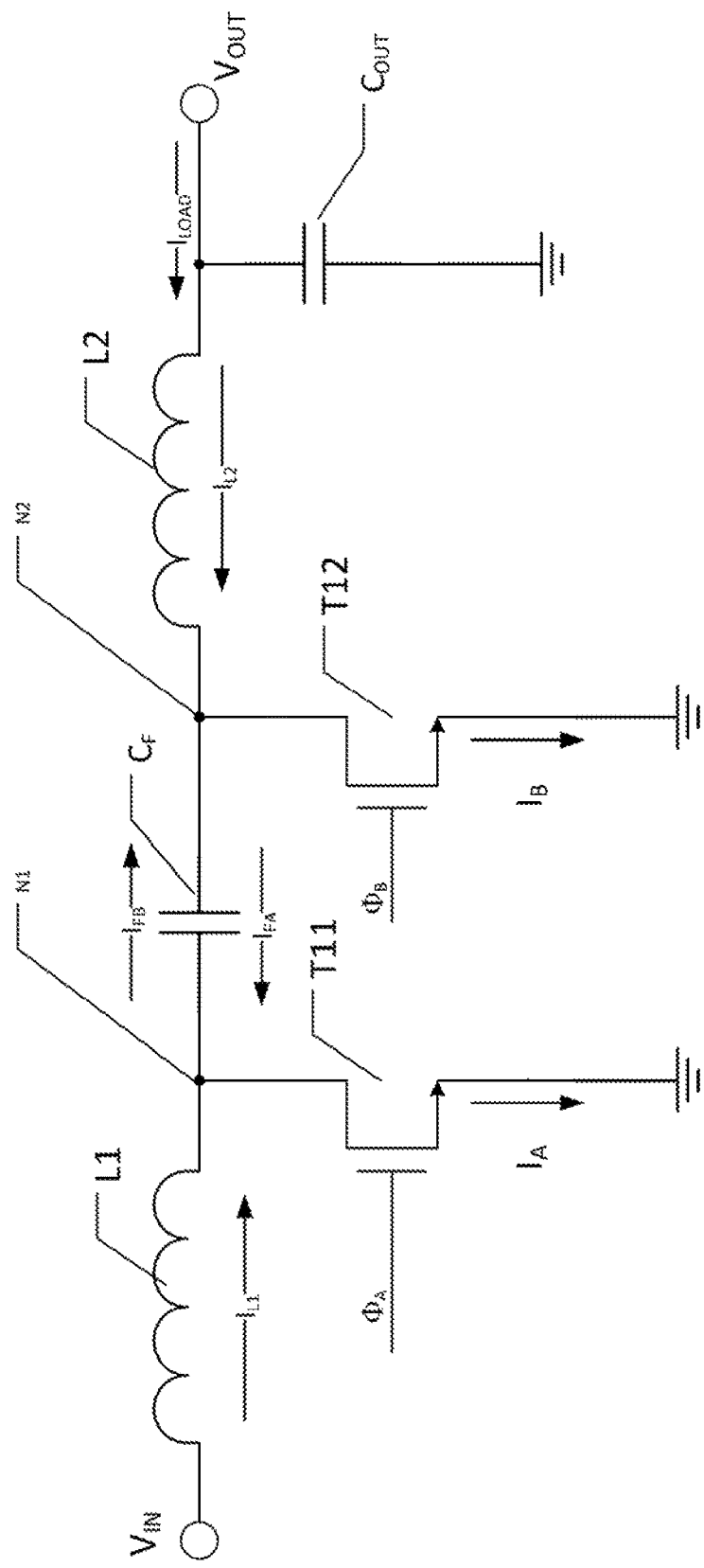
FIG. 1b is an electrical diagram, in schematic form, of a conventional inverting Ćuk-type voltage converter.
Figure 2:
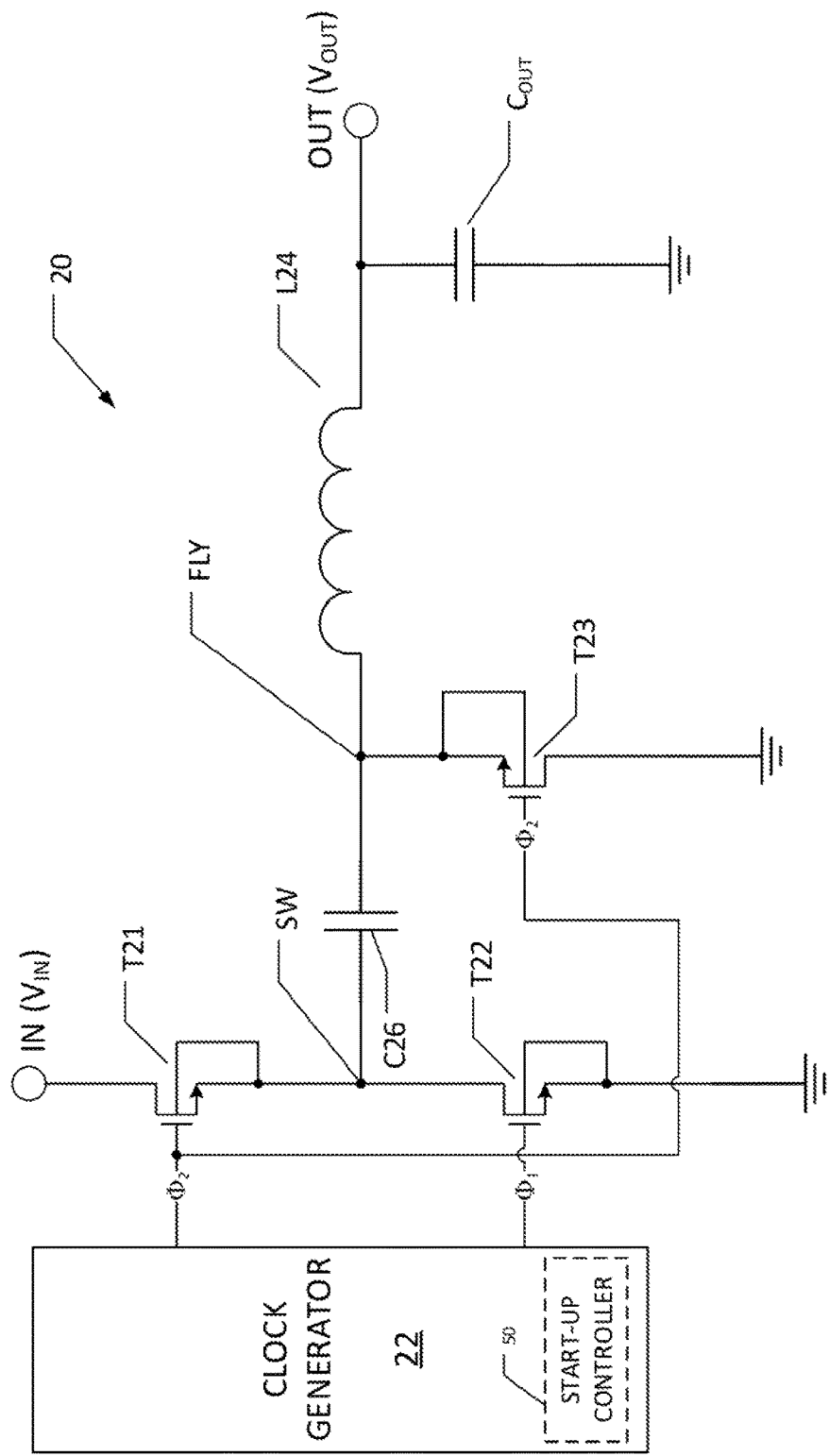
FIG. 2 is an electrical diagram, in schematic form, of an inverting buck voltage converter according to an embodiment.

FIG. 2 illustrates the construction of switched-mode inverting buck converter 20 according to an embodiment. According to this embodiment, converter 20 includes power switches in the form of n-channel MOS transistors T21, T22, T23, flying capacitor C26, inductor L24, and output capacitor $C_{OUT}$. Transistors T21, T22 have their source-drain paths connected in series between input terminal IN and a ground node. Clock generator 22 generates non-overlapping periodic clock phases $\Phi_1$, $\Phi_2$. Clock phase $\Phi_1$ is applied to the gate of transistor T22, and clock phase $\Phi_2$ is applied to the gates of transistors T21 and T23. As will be described in further detail below, gate driver circuitry (not shown in FIG. 2) may be provided to apply the actual gate drive to transistors T21, T22 (and transistor T23) in response to these clock phases $\Phi_1$, $\Phi_2$. Clock generator 22 may be constructed in the conventional manner as commonly used in switched-mode voltage converter applications, typically with the relative duty cycles of clock phases $\Phi_1$, $\Phi_2$ adjusted so as to produce the desired output voltage $V_{OUT}$. For example, clock generator 22 may include a feedback control loop to modulate the duty cycle of clock phases $\Phi_1$, $\Phi_2$ based on a comparison of output voltage $V_{OUT}$ with a desired reference voltage. In any case, node SW at which the source of transistor T21 is connected to the drain of transistor T22, is switched between input terminal $V_{IN}$ and ground within each of these clock cycles.

"Flying" capacitor C26 is connected between switched node SW and "flying" node FLY. Flying node FLY is connected to the source-drain path of rectifying n-channel MOS transistor T23, which receives clock phase $\Phi_2$ from clock generator 22. As will be apparent from the following description, the voltage at flying node FLY will be at or below ground in this embodiment, and as such the source and body node of transistor T23 are connected to flying node FLY, and the drain of transistor T23 is connected to ground. Rectifying transistor T23 may be alternatively be realized as a diode, if desired. As will become apparent from the description below, transistors T21, T22, T23 and flying capacitor C26 provide an input stage that operates as an inverting charge pump, with the voltage at flying node FLY stabilizing at the input voltage $-V_{IN}$.

Inductor L24 and output capacitor $C_{OUT}$ constitute the output stage of converter 20. Inductor L24 is connected between flying node FLY and output terminal OUT, at which the output voltage $V_{OUT}$ is presented. Output capacitor $C_{OUT}$ is connected between output terminal OUT and ground, and operates as a low-pass filter to smooth the output voltage $V_{OUT}$ at terminal OUT.

In some implementations, either or both of flying capacitor C26 and inductor L24 may be realized externally to an integrated circuit in which transistors T21, T22, T23, clock generator 22, and other circuitry are realized. Alternatively, flying capacitor C26 and inductor L24 may also be realized in the same integrated circuit as the other circuit elements of these embodiments.

According to this construction, inverting buck converter 20 may be considered as a "hybrid" converter" consisting of an inverting charge pump input stage, and an inductive buck output stage. As will be evident from the following description of the operation of converter 20, this hybrid construction provides important advantages in generating an inverted DC output voltage with low ripple and excellent transient response, along with other advantages over conventional inverting DC converters.

Figure 3A:
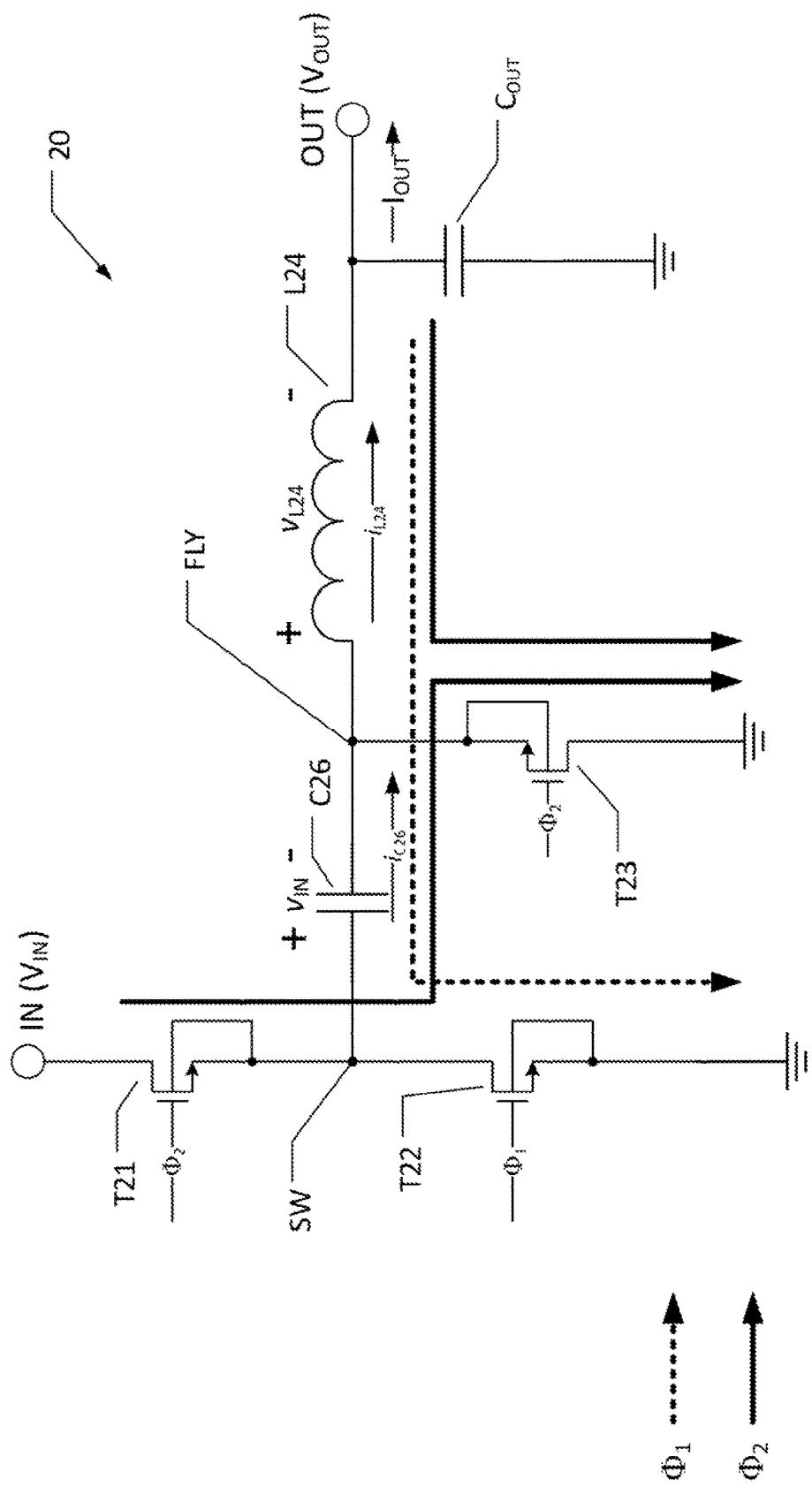
FIG. 3a is an electrical diagram, in schematic form, of the inverting buck voltage converter according to the embodiment of FIG. 2, illustrating current flow in two clock phases of a periodic clock signal.
Figure 3B:
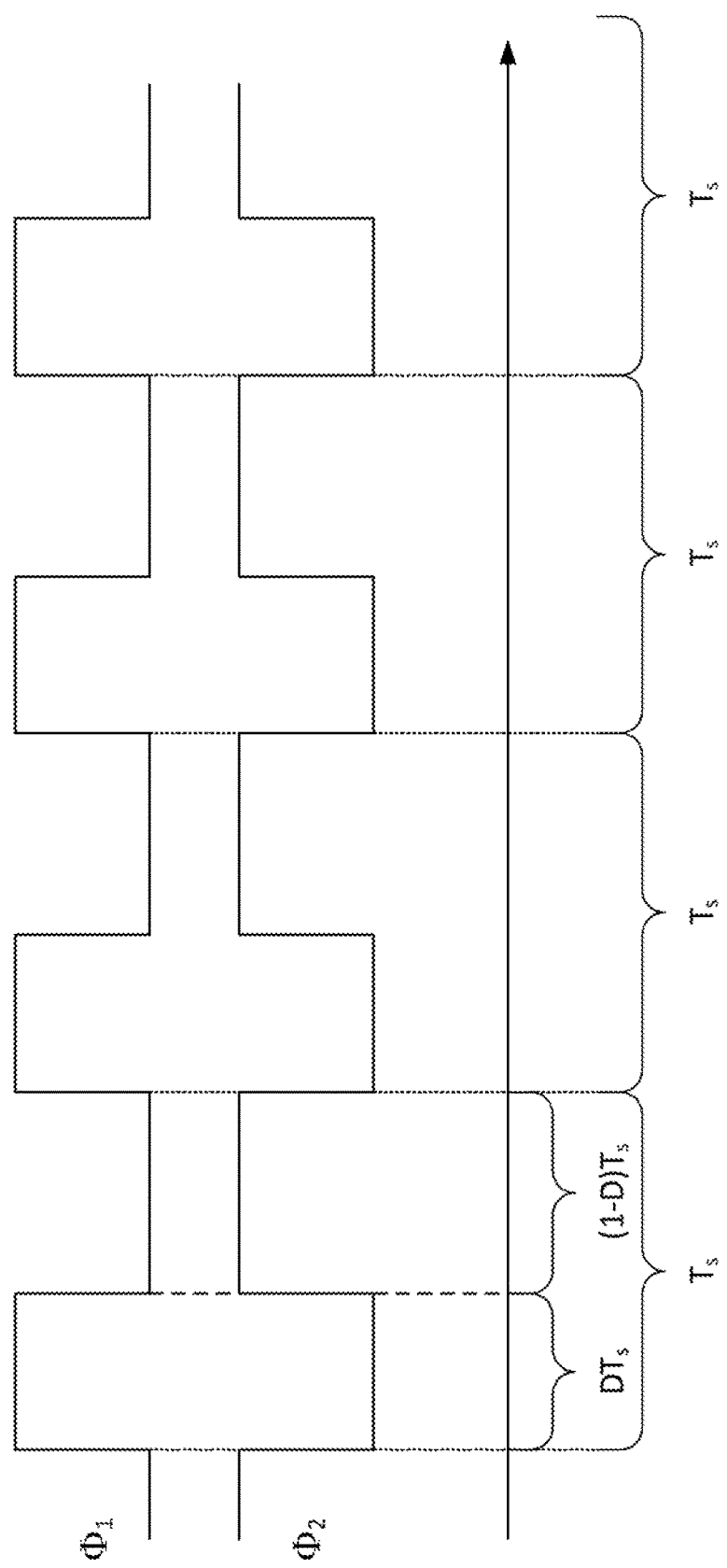

Referring now to FIGS. 3a and 3b, the operation of inverting buck voltage converter 20 according to this embodiment will now be described in detail. FIG. 3a illustrates the arrangement of converter 20 shown in FIG. 2, along with current conduction paths in each of the clock phases $\Phi_1$, $\Phi_2$. As mentioned above, clock phases $\Phi_1$, $\Phi_2$ are complementary non-overlapping clock phases generated by clock generator 22 in the conventional manner. FIG. 3b illustrates an example of clock phases $\Phi_1$, $\Phi_2$ within a sequence of clock cycles of period $T_s$. Since n-channel MOS transistors T21, T22, T23 are turned on by a high logic level of the one of clock phases $\Phi_1$, $\Phi_2$ at their respective gates, the duty cycle D will be considered as the fraction of the time within each clock period that clock phase $\Phi_1$ is at a high logic level. Clock phase $\Phi_1$ will thus be at a high level for a duration of $DT_s$ within each clock cycle, while complementary clock phase $\Phi_2$ will be at a high logic level for a duration $(1-D)T_s$. As will become apparent from the following description, the DC gain of converter 20 is controlled by duty cycle D:

$$\frac{V_{OUT}}{V_{IN}} = -D$$

As described above and as shown in FIG. 3a, transistor T21 and rectifying transistor T23 are turned on in clock phase $\Phi_2$, while transistor T22 is turned off. Referring to the input stage of converter 20, the voltage across flying capacitor C26 is charged to input voltage $V_{IN}$ during clock phase $\Phi_2$, with switched node SW positive relative to flying node FLY, which is at ground by virtue of transistor T23 being on. In clock phase $\Phi_1$, transistor T22 in the input stage is turned on and transistors T21, T23 are turned off, pulling switched node SW to ground. Because the voltage across flying capacitor C26 cannot instantaneously change, the voltage at flying node FLY drops to $-V_{IN}$ (below ground). If rectifying transistor T23 is instead realized as a diode, as mentioned above, this negative voltage $-V_{IN}$ at flying node FLY would reverse-bias that diode. In either case, transistor T23 operates to rectify the voltage at flying node FLY. As such, the input stage of converter 20 operates as a charge pump to develop the input voltage $V_{IN}$ across capacitor C26.

In the output stage of converter 20, the voltage $V_{L24}$ across inductor L24 is at $-V_{OUT}$ during clock phase $\Phi_2$, because flying node FLY is at ground; this voltage $-V_{OUT}$ is a positive voltage. During clock phase $\Phi_1$, this voltage $V_{L24}$ across inductor L24 is the difference $-V_{IN}-V_{OUT}$ which, presuming $|V_{IN}|>|V_{OUT}|$, is a negative voltage. Inductor current $i_{L24}$ is conducted from output terminal OUT during both clock phases $\Phi_1$ and $\Phi_2$; this inductor current $i_{L24}$ is a negative current according to the convention of FIG. 3a. The inductor current $i_{L24}$ of course cannot change instantaneously from phase to phase. During clock phase $\Phi_2$, inductor current $i_{L24}$ is conducted through rectifying transistor T23, and during clock phase $\Phi_1$, inductor current $i_{L24}$ is discharging flying capacitor C26 through transistor T22.

Figure 3C:
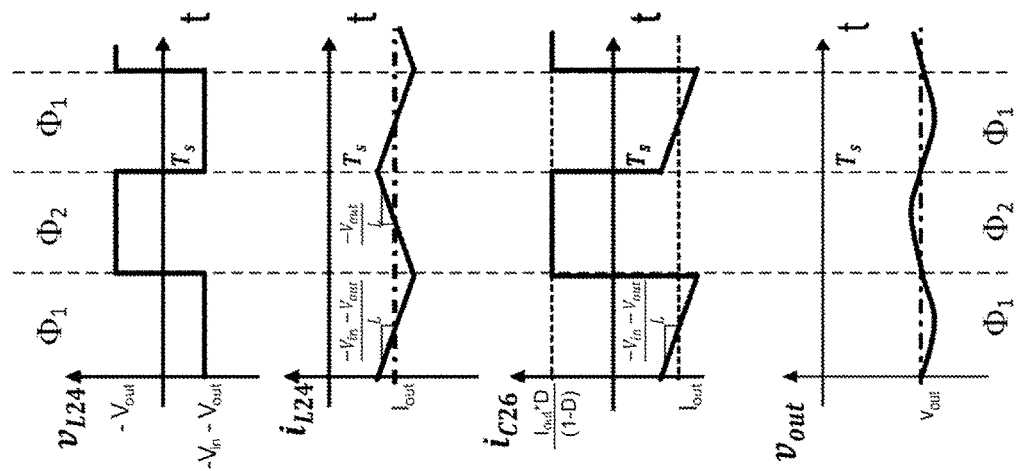
FIG. 3c illustrates plots of currents and voltages in the inverting buck voltage converter in the two clock phases of FIGS. 3a and 3b.

FIG. 3c illustrates the variation of voltages and currents in converter 20 during clock phases $\Phi_1$, $\Phi_2$. As discussed above, inductor voltage $v_{L24}$ varies between the negative voltage of $-V_{IN}-V_{OUT}$ in clock phase $\Phi_1$ and the positive voltage of $-V_{OUT}$ in clock phase $\Phi_2$. While inductor current $i_{L24}$ cannot instantaneously change from phase to phase, the negative voltage $v_{L24}$ across inductor L24 will cause inductor current $i_{L24}$ to decrease during clock phase $\Phi_1$, at a slope of $(-V_{IN}-V_{OUT})/L$, where L is the inductance of inductor L24. Conversely, the positive voltage $v_{L24}=-V_{OUT}$ across inductor L24 during clock phase $\Phi_2$ causes inductor current $I_{L24}$ to increase, at a slope of $-V_{OUT}/L$, as shown in FIG. 3c. Inductor current $i_{L24}$ is of course the sum of an output current at output terminal OUT and the charging and discharging current of output capacitor $C_{OUT}$. Assuming output capacitor $C_{OUT}$ to be sufficiently large to absorb the variation in inductor current $i_{L24}$ from phase to phase, converter 20 is able to source a continuous and relatively constant output current at output terminal OUT, at a level indicated by time-average current $I_{OUT}$ in the plot of inductor current $i_{L24}$ shown in FIG. 3c.

FIG. 3c also illustrates the current $i_{C26}$ through flying capacitor C26 in clock phases $\Phi_1$, $\Phi_2$. During phase $\Phi_1$, flying capacitor C26 is conducting inductor current $i_{L24}$, which is a negative current varying at a slope of $(-V_{IN}-V_{OUT})/L$, as discussed above. In clock phase $\Phi_2$, flying capacitor is being charged to input voltage $V_{IN}$ via transistor T21. Considerations of charge balance indicate that the charge stored in flying capacitor C26 during clock phase $\Phi_2$ supports the inductor current $i_{L24}$ during the duration of clock phase $\Phi_1$. Accordingly, in the steady state, the current $I_{C26}$ charging flying capacitor C26 during clock phase $\Phi_2$ is the DC output current $I_{OUT}$ divided by the duty cycle of clock phase $\Phi_2$, which is $(1-D)T_s$.

As evident from this description, converter 20 provides a continuous output current $I_{OUT}$ over both clock phases $\Phi_1$, $\Phi_2$, as a result of its inductive output stage in combination with the action of flying capacitor C26 that is charged by the charge pump input stage. As a result, assuming output capacitor $C_{OUT}$ is properly sized, the output voltage ripple $V_{OUT}$ on the DC output voltage $V_{OUT}$ can be relatively small, as indicated in FIG. 3c. This continuous output current is reflected in the transfer characteristic of converter 20 by the absence of zeroes in the right-half-plane (RHP). As known in the art, the absence of RHP zeroes allows the control bandwidth of converter 20 to be much higher than conventional converters, such as the buck-boost and Ćuk converters discussed above. Excellent transient response is thus provided by converter 20 according to this embodiment.

In addition, none of transistors T21, T22, T23 see a drain-to-source voltage greater than $|V_{IN}|$, which is significantly lower than the sum of the input and output voltage magnitudes at one or more of the power switches in conventional inverting converters. As a result, transistors T21, T22, T23 need only be rated to the specification limit of input voltage $V_{IN}$, and thus of reduced gate length in comparison with the power switches in conventional converters. In addition, the gate voltages applied to transistors T21, T22, T23 can be at the level of input voltage $V_{IN}$, if desired to facilitate routing and layout and if input voltage $V_{IN}$ is at a suitable voltage.

In converter 20 according to this embodiment, the time-averaged charging current $I_{C26}$ of flying capacitor C26 is:

$$I_{C26} = \frac{D}{(1-D)} \cdot I_{OUT}$$

Accordingly, this capacitor current can become disproportionately high at large duty-cycles D. It is therefore preferred that the implementation of converter 20 include some type of limiting function on the input current required of or conducted through transistor T21 from input terminal IN, in order to protect flying capacitor C26 and other circuit elements from damage caused by overcurrent conditions.

Figure 4:
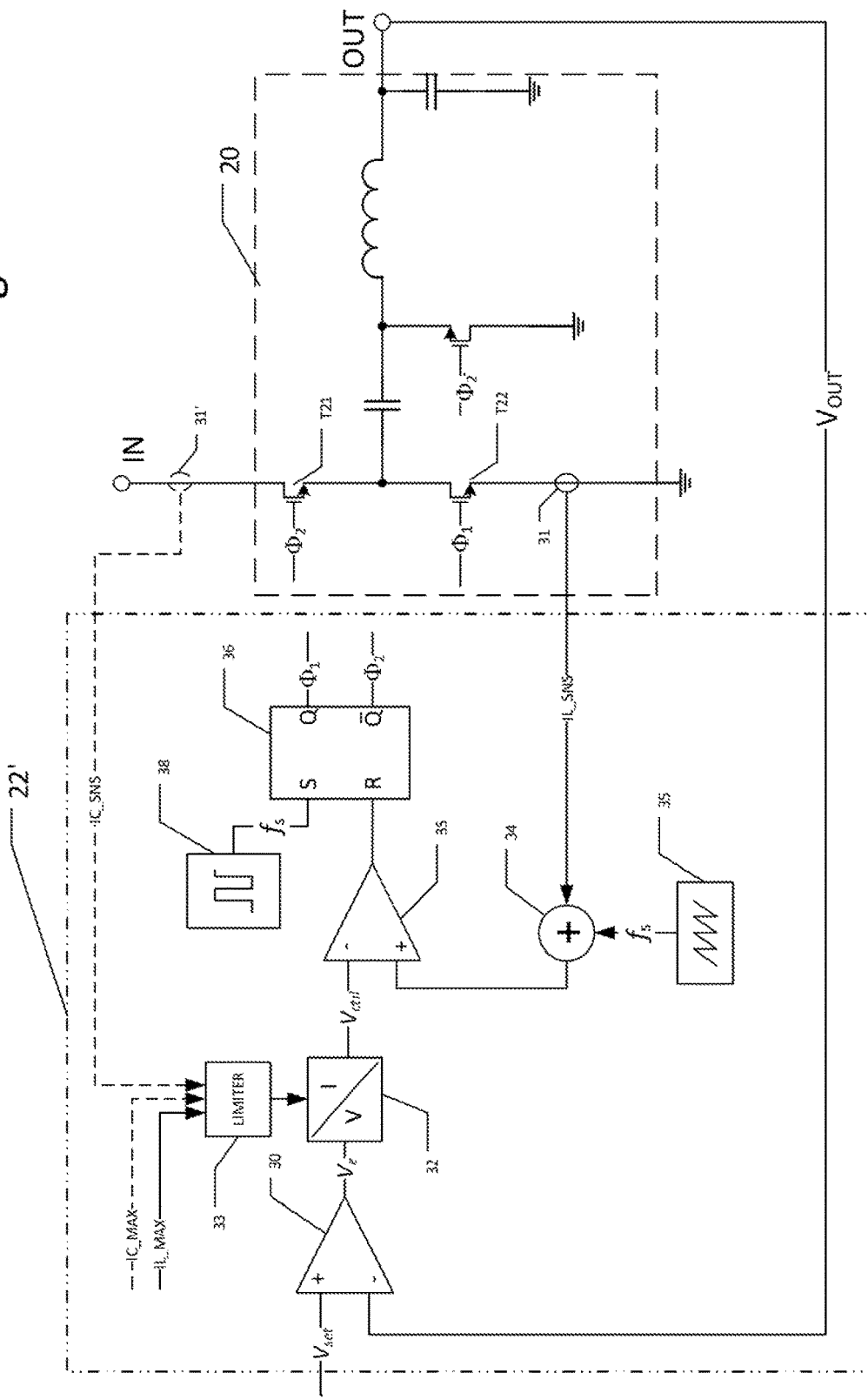
FIG. 4 is an electrical diagram, in block and schematic form, of an inverting buck voltage converter with control circuitry for limiting its current, according to an embodiment.

FIG. 4 illustrates a closed-loop arrangement for limiting the inductor current $I_{L24}$ and thus the current $I_{C26}$ conducted by flying capacitor C26, according to an embodiment. In this implementation, clock generator 22 thereafter labeled as 22' in the Figure for distinction to earlier Figure) includes differential error amplifier 30 that receives the desired output voltage $V_{set}$ at one input and the actual output voltage $V_{OUT}$ at another input. Differential amplifier 30 generates error signal $V_e$ at its output, which corresponds to the difference between the desired voltage $V_{set}$ and the current output voltage $V_{OUT}$, which is applied to V-I limiting circuit 32 (after low-pass filtering if desired). Limiting circuit 32 generates a control signal $V_{ctrl}$ in response to this error signal $V_e$, subject to a control input from limiter 33 in response to a maximum inductor current input IL_MAX, which may be stored in a configuration register or otherwise provided to converter 20. Control signal $V_{ctrl}$ is in turn presented to an inverting (negative) input of comparator 35.

According to this embodiment, low-side current sensor 31 is a conventional non-contact current sensor, or alternatively an amplifier generating a signal responsive to a voltage across a small resistor, for sensing the current conducted by the source-drain path of the low-side transistor T22 of inverting buck converter 20 in clock phase $\Phi_1$. The current sense signal IL_SNS is applied to one input of adder 34, which receives a sawtooth waveform from generator 35 at another input, and which presents its output corresponding to the sum of the signals at its inputs to a non-inverting (positive) input of comparator 35. The output of comparator 35 is applied to the reset input of RS flip-flop 36. Constant frequency generator 38 presents a square-wave waveform at a constant frequency fs, at a constant duty cycle (e.g., 50%) to the set input of flip-flop 36. The frequency of the sawtooth waveform issued by generator 35 is also at this same constant frequency fs. Clock phase $\Phi_1$ is generated at the Q output of flip-flop 36, while clock phase $\Phi_2$ is generated at the $\overline{Q}$ output.

In operation, clock generator 22 operates according to a peak-current, constant-frequency control approach, in which the time in each cycle at which clock phase $\Phi_1$ is terminated and clock phase $\Phi_2$ commences is based on a comparison between the inductor current and the control signal $V_{ctrl}$, which is limited to a maximum level in response to input IL_MAX. More specifically, flip-flop 36 issues clock phase $\Phi_1$ at the beginning of each cycle of the constant frequency square-wave fs, on receiving the positive-going edge at its S input. Later in each cycle, comparator 35 issues a positive-going edge at the R input of flip-flop 36 at the point in each cycle at which the sawtooth waveform, DC-shifted by the inductor current $I_{L24}$ conducted by transistor T22 during clock phase $\Phi_1$, exceeds the level of control signal $V_{ctrl}$ corresponding to the difference between the current output voltage $V_{OUT}$ and the desired voltage $V_{set}$, limited to a maximum IL_MAX. Since both the desired voltage $V_{set}$ and output voltage $V_{OUT}$ are negative voltages, and the current conducted by transistor T22 is a negative current, the maximum IL_MAX limits how early that clock phase $\Phi_2$ can be initiated in each cycle, and thus indirectly limits the capacitor current $I_{C26}$ conducted in converter 20.

In the alternative to the peak-current, constant-frequency control approach shown in FIG. 4, a "constant off-time" approach may be implemented in a similar arrangement. More specifically, and as known in the art, constant off-time control may be implemented by modulating the frequency fs of clock phases $\Phi_1$ and $\Phi_2$ while maintaining a constant pulse width of clock phase $\Phi_2$ in each cycle. Either of these control topologies may be implemented by sensing the low-side current through transistor T22 (i.e., inductor current $I_{L26}$ in clock phase $\varphi_1$) and receiving a maximum inductor current input IL_MAX, as shown in FIG. 4.

According to another embodiment, the capacitor current $I_{C26}$ may be directly limited. FIG. 4 suggests one approach for this direct capacitor current control, in which high-side current sensor 31' is inserted in series with the drain-to-source path of transistor T21 to directly sense capacitor current $I_{C26}$ conducted by transistor T21 in clock phase $\Phi_2$. In the general sense suggested by FIG. 4, current signal IC_SNS from current sensor 31' is fed back to limiter 33, which also receives an input IC_MAX indicating the desired maximum level of capacitor current $I_{C26}$, and which will operate to limit control voltage $V_{ctrl}$, and thus clock phases $\Phi_1$, $\Phi_2$, so as to limit capacitor current $I_{C26}$ as it approaches the maximum IC_MAX. Other alternative approaches for implementing the direct control of capacitor current $I_{C26}$, such as a peak-current/constant-frequency approach or a constant off-time/variable frequency approach, as mentioned above, are also contemplated.

As described above, transistor T21 operates as a power switch in inverting buck converter 20, while transistor T23 operates as a rectifier. Both of these transistors are gated by clock phase $\Phi_2$, which is generated by clock generator 22 to be a non-overlapping clock phase relative to clock phase $\Phi_1$. According to an embodiment, the manner in which the gate drive of these transistors T21, T23 can be implemented in a particularly beneficial way to both protect flying capacitor C26 from overcurrent damage, and also to maximize the performance of converter 20, as will now be described relative to FIG. 5.

Figure 5:
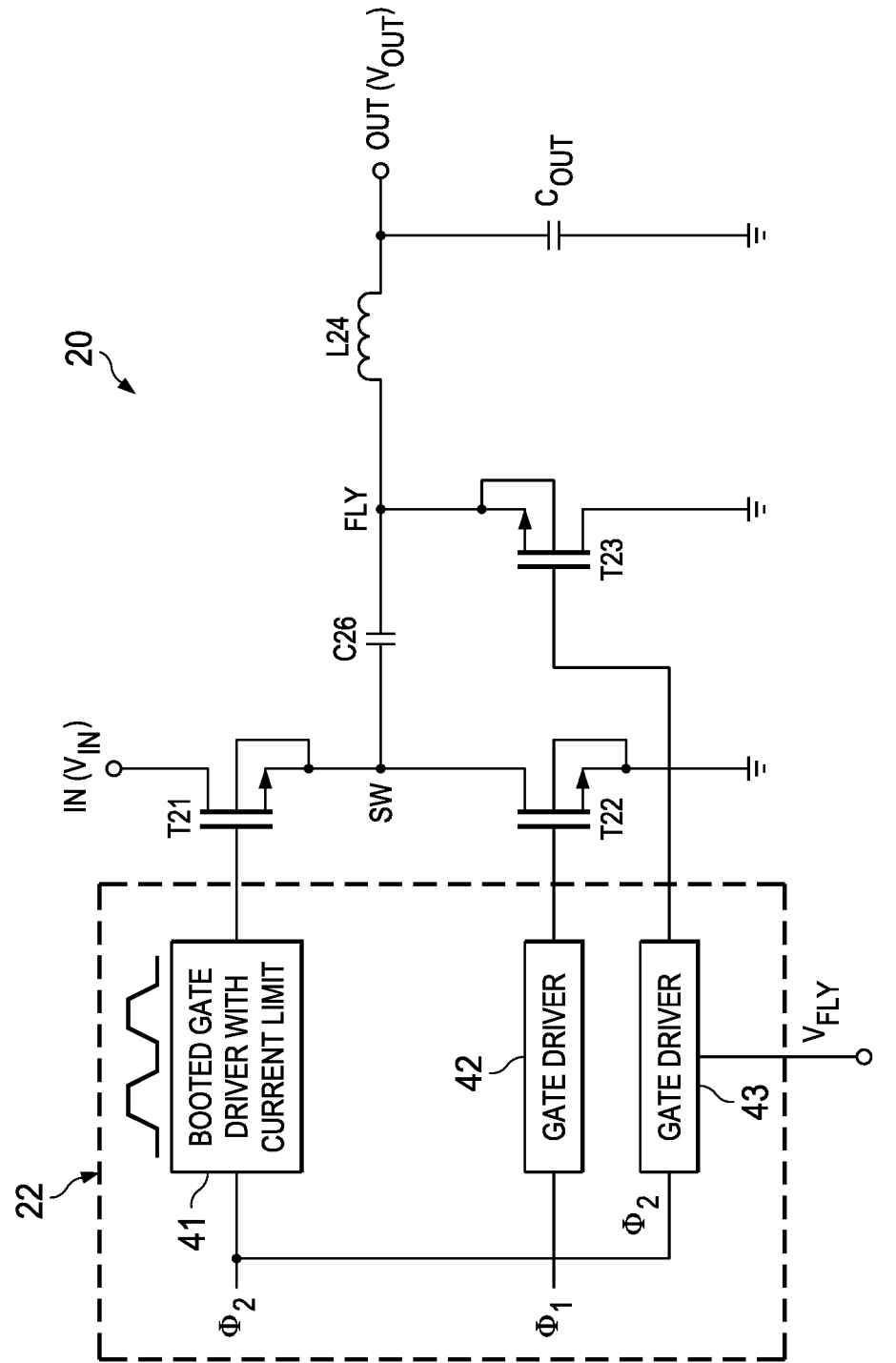
FIG. 5 is an electrical diagram, in block and schematic form, of an inverting buck voltage converter with gate driver circuitry, according to another embodiment.

FIG. 5 illustrates the construction of converter 20 in combination with gate driver circuitry, provided within clock generator 22 (FIG. 2), which drives the gates of each of transistors T21, T22, T23 from clock phases $\Phi_1$, $\Phi_2$. According to this implementation, gate driver 41 drives the gate of transistors T21 from clock phase $\Phi_2$ in such a way as to control the charging current applied by transistor T21 to flying capacitor C26. Gate driver 41 may be constructed as a conventional "bootstrapped" gate driver, such as described in Meyer et al., "Providing Continuous Gate Drive Using a Charge Pump", Application Report SLVA444 (Texas Instruments Incorporated, 2011), incorporated herein by reference, but with the bootstrap capacitor provided internally to gate driver 41. Because of this bootstrapping, as known in the art, the gate voltage applied to transistor T21 can be above input voltage $V_{IN}$, which enables transistor T21 to drive switched node SW fully to input voltage $V_{IN}$ without a diode drop across transistor T21. In addition, gate driver 41 preferably includes a current limiting function, such as known in the art for the "high-side" switch of conventional voltage converters, an example of which is the TPS54240 step-down DC-DC converter available from Texas Instruments Incorporated. This current limiting function further protects flying capacitor C26 from overcurrent damage.

An additional gate drive approach that may be used in connection with this embodiment is for gate driver 41 to drive the gate voltage of transistor T21 with a trapezoidal waveform, i.e. applying a controlled rise time to the rising edge of the gate voltage turning on transistor T21, and a controlled fall time to the trailing edge of that gate drive. This trapezoidal waveform serves to limit the slew rate of the charging current $i_{C26}$ (i.e., limits the time-rate of change dI/dt of current $i_{C26}$), and controlling the time rate of change of the voltage across flying capacitor C26. It is contemplated that those skilled in the art having reference to this specification will be readily able to construct gate driver 41 that accomplishes these functions, without undue experimentation.

In this embodiment, gate driver 43 drives the gate of rectifying transistor T23 from clock phase $\Phi_2$. In order to fully turn off transistor T23 during clock phase $\Phi_1$, gate driver 43 is referred to the voltage $V_{FLY}$ at flying node FLY which, as described above, is at voltage $-V_{IN}$ during clock phase $\Phi_1$. In this implementation in which input voltage VII, is at a suitable level (e.g., less than the maximum gate voltage specified for the particular transistor technology), gate driver 43 is also referred to input voltage $V_{IN}$, for purposes of its "on" state drive, and is otherwise constructed in the conventional manner. For implementations in which input voltage $V_{IN}$ is greater than the specified maximum gate voltage, the power supply rail applied to gate driver 43 may be provided as a regulated voltage, for example based on input voltage $V_{IN}$. Gate driver 42, which drives the gate of transistor T22 from clock phase $\Phi_1$, may be constructed in the conventional manner, and as such may refer to input voltage $V_{IN}$ (if appropriate) and circuit ground.

According to this embodiment, the control and limiting of the charging current provided by gate driver 41 in this manner, by way of either or both of its current limited operation and its generation of a trapezoidal output waveform as described above, assists in controlling the charging current $i_{C26}$ applied to flying capacitor C26 in converter 20. This gate driver control may be used independently of, or in combination with, other techniques for limiting the capacitor current, such as discussed above relative to FIG. 4 and discussed below in connection with the startup of converter 20.

Overcurrent conditions can especially arise during startup of converter 20 from a powered-down condition. When converter 20 is powered-down, both the voltage across flying capacitor C26 and the voltage at terminal OUT, across capacitor $C_{OUT}$, are at zero volts. Startup of converter 20 thus involves the charging of flying capacitor C26 to the input voltage $V_{IN}$, and the charging of output capacitor $C_{OUT}$ to its target voltage $V_{OUT}$. While short startup times are of course desirable, rapid startup of converter 20 can present the risk of high current levels in charging capacitors C26 and $C_{OUT}$.

According to these embodiments, startup is managed by start-up controller 50, which may be included within clock generator function 22 as shown in FIG. 2. In this embodiment, start-up controller 50 controls the startup of converter 20 by either sequentially charging flying capacitor C26 before developing the output voltage $V_{OUT}$, or by a controlled simultaneous charging of flying capacitor C26 and output capacitor $C_{OUT}$. Start-up controller 50 may be realized by the appropriate combinational or sequential logic for carrying out and controlling the operations described below in connection with FIGS. 6a and 6b. It is contemplated that those skilled in the art having reference to this specification will be readily able to implement the appropriate logic and control circuitry for carrying out these start-up operations, without undue experimentation.

Referring now to FIG. 6a, the sequential charging of flying capacitor C26 and output capacitor $C_{OUT}$ according to an embodiment will now be described. The charging of flying capacitor C26 begins with processes 60 and 61, which are performed simultaneously with one another. In process 60, transistor T21 is biased to operate as a current source, during which transistor T23 is turned on in process 61. Transistor T22 is turned off at this time. Under these conditions, the current conducted by transistor T21 begins charging flying capacitor C26 toward input voltage $V_{IN}$, shown by process 62 of FIG. 5a. It is desirable that the gate bias applied to transistor T21 be controlled during this process 62 so that the voltage across flying capacitor C26 develops linearly over time, to avoid an overcurrent condition. In addition, control of the current conducted by transistor T21 should be maintained to ensure that any natural oscillation at the output stage of inductor L24 and output capacitor $C_{OUT}$ in response to the voltage drop across transistor T23 does not become excessive. Process 62 continues until flying capacitor C26 charges to a voltage at or about input voltage $V_{IN}$, which may be determined by the voltage at switched node SW being communicated back to start-up controller 50, or by continuing the bias conditions of processes 60, 61 for a pre-selected duration of time.

Upon flying capacitor C26 charging to a voltage at or about input voltage $V_{IN}$, process 64 is then initiated by start-up controller 50, cycling clock phases $\Phi_1$, $\Phi_2$ at a selected duty cycle and at a constant clock frequency, for example under closed-loop control such as described above relative to FIG. 4b, to develop the output voltage $V_{OUT}$ at output terminal OUT and across output capacitor $C_{OUT}$. In this regard, it may be necessary to apply conventional frequency foldback as necessary to support short on-times (i.e., very low duty cycles) in this process 64. Once output voltage $V_{OUT}$ reaches its target voltage, the generation of clock phases $\Phi_1$, $\Phi_2$ can continue in the manner described above.

Alternatively, startup of converter 20 may simultaneously charge flying capacitor C26 while also developing an output voltage $V_{OUT}$ at output terminal OUT, as will now be described relative to FIG. 6b. According to this approach, start-up controller 50 cycles clock phases $\Phi_1$, $\Phi_2$ at a selected duty cycle in process 66. During this process 66, transistor T21 is sensed (e.g., by resistive current sensor 35 of FIG. 4b, or by a contactless current sensor, and fed back to start-up controller 50) and controlled by start-up controller 50 so that flying capacitor C26 charges linearly toward input voltage $V_{IN}$. During this time, the clocking of transistors T21, T22, T23 will cause current to be conducted by inductor L24, and a negative polarity voltage $V_{OUT}$ to develop at terminal OUT. It will be useful to limit the current conducted by transistor T21 during this process 66, as the "high-side" losses occurring during the initial charging of flying capacitor C26 can be significant.

Upon flying capacitor C26 being charged to input voltage $V_{IN}$, normal closed-loop operation of converter 20 is then performed in process 68, with clock phases $\Phi_1$, $\Phi_2$ cycled at the appropriate duty cycle to complete development of the desired target voltage $V_{OUT}$ at terminal OUT. The startup of converter 20 is then complete according to this simultaneous approach.

As mentioned above, any or all of these described techniques for controlling the charging current applied to flying capacitor C26 may be implemented in a particular installation of converter 20. It is contemplated that the combination of these techniques will provide excellent protection for flying capacitor C26 and inductor L24 against overcurrent conditions, both during operation and also during startup.

According to these embodiments, an inverting buck converter circuit of a hybrid topology is provided that can generate a negative polarity voltage, relative to a positive polarity input voltage, as is desirable for many modern system applications as noted above. The converter according to these embodiments minimizes the number of external or reactive components to a single inductor and single capacitor, thus reducing the cost and complexity of implementation. In addition, the converter according to these embodiments can be implemented with power switching transistors that need only be rated to sustain the input voltage amplitude, and can thus be constructed in smaller chip area and thus at lower cost. The continuous output current sourced by the converter according to these embodiments results in minimal output voltage ripple, and the hybrid topology presents a transfer characteristic with no zeroes in the right-half-plane, indicating excellent transient response. It is further contemplated that the overall efficiency of the converter according to these embodiments is also excellent, as a result of its rectifying device operating in a synchronous fashion.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A voltage converter circuit, comprising:
    clock circuitry for generating first and second non-overlapping clock phases;
    a first transistor, having a conduction path coupled between an input terminal and a switched node, and having a control terminal coupled to the clock circuitry, so that the first transistor is on during the second clock phase;
    a second transistor, having a conduction path coupled between the switched node and a ground node, and having a control terminal coupled to the clock circuitry, so that the second transistor is on during the first clock phase;
    a flying capacitor connected between the switched node and a flying node;
    a rectifier connected between the flying node and a ground node;
    an inductor connected between the flying node and an output terminal;
    control circuitry for limiting a charging current applied to the flying capacitor; and
    an error amplifier having: a first input to receive a desired voltage level; a second input to receive a voltage from the output terminal; and an output for presenting an error signal responsive to a difference between the voltages at its first and second inputs;
    wherein the control circuitry comprises:
        a current sensor for sensing a current conducted by one of the first and second transistors;
        a limiting circuit to receive the error signal and a maximum current input, and to generate a control signal at an output, the control signal corresponding to the error signal subject to a limit corresponding to the maximum current input; and
        a comparator coupled to receive the control signal and a signal corresponding to the sensed current at inputs of the comparator, and having an output for presenting a timing signal to the clock circuitry responsive to a comparison of the signals at its inputs, the timing signal for controlling a timing at which the clock circuitry generates the first and second clock phases.

2. The circuit of claim 1, wherein the timing signal controls a time, within constant frequency cycles, at which the first clock phase ends and the second clock phase begins.

3. The circuit of claim 1, wherein the clock circuitry is for generating second clock phases of a constant duration, and the timing signal is for modulating a frequency of cycles responsive to the comparison of the signals at the inputs of the comparator.

4. A voltage converter circuit, comprising:
    clock circuitry for generating first and second non-overlapping clock phases;
    a first transistor, having a conduction path coupled between an input terminal and a switched node, and having a control terminal coupled to the clock circuitry, so that the first transistor is on during the second clock phase;
    a second transistor, having a conduction path coupled between the switched node and a ground node, and having a control terminal coupled to the clock circuitry, so that the second transistor is on during the first clock phase;
    a flying capacitor connected between the switched node and a flying node;
    a rectifier connected between the flying node and a ground node;
    an inductor connected between the flying node and an output terminal; and
    start-up control circuitry for sequentially starting up the circuit from a powered-down condition, by: biasing the first transistor to operate as a current source while turning off the second transistor, until the flying capacitor is charged to a voltage corresponding to the input voltage; and then controlling the clock circuitry to generate the first and second clock phases.

5. A voltage converter circuit, comprising:
clock circuitry for generating first and second non-overlapping clock phases;
a first transistor, having a conduction path coupled between an input terminal and a switched node, and having a control terminal coupled to the clock circuitry, so that the first transistor is on during the second clock phase;
a second transistor, having a conduction path coupled between the switched node and a ground node, and having a control terminal coupled to the clock circuitry, so that the second transistor is on during the first clock phase;
a flying capacitor connected between the switched node and a flying node;
a rectifier connected between the flying node and a ground node;
an inductor connected between the flying node and an output terminal; and
start-up control circuitry for starting up the circuit from a powered-down condition, by: controlling the clock circuitry to generate the first and second clock phases at a frequency and duty cycle to linearly charge the flying capacitor to a voltage corresponding to the input voltage.

6. The circuit of claim 5, further comprising:
an output capacitor, coupled between the output terminal and a ground node.

7. The circuit of claim 5, wherein the rectifier comprises:
a third transistor, having a conduction path coupled between the flying node and the ground node, and having a control terminal coupled to the clock circuitry so that the third transistor is on during the second clock phase.

8. The circuit of claim 5, further comprising:
a current limiting gate driver circuit for applying a control voltage to the control terminal of the first transistor responsive to the second clock phase.

9. The circuit of claim 8, wherein the current limiting gate driver is coupled to apply the control voltage to the control terminal of the first transistor as a trapezoidal waveform, responsive to the second clock phase.

10. A method of generating an output DC voltage from an input DC voltage, comprising:
generating first and second non-overlapping clock phases over a sequence of a plurality of clock periods;
in the second clock phase within each of the plurality of clock periods, charging a capacitor from the input DC voltage, the capacitor connected between a switched node and a flying node, the flying node coupled to a ground node by a rectifier and coupled by an inductor to an output terminal at which the output DC voltage is presented, wherein the rectifier is not conductive in the first clock phase, the rectifier comprises a rectifying transistor having a conduction path coupled between the flying node and the ground node, and the charging of the capacitor comprises: turning on a first transistor having a conduction path coupled between the switched node and an input terminal receiving the input DC voltage; and turning on the rectifying transistor;
in the first clock phase within each of the plurality of clock periods, coupling the switched node to the ground node, comprising: turning on a second transistor having a conduction path coupled between the switched node and the ground node; and turning off the rectifying transistor;
at start-up from a powered-down condition and before the generating of the first and second clock phases, biasing the first transistor to operate as a current source while turning off the second transistor, until the capacitor is charged to a voltage corresponding to the input DC voltage; and
then generating the first and second clock phases.

11. A method of generating an output DC voltage from an input DC voltage, comprising:
generating first and second non-overlapping clock phases over a sequence of a plurality of clock periods;
in the second clock phase within each of the plurality of clock periods, charging a capacitor from the input DC voltage, the capacitor connected between a switched node and a flying node, the flying node coupled to a ground node by a rectifier and coupled by an inductor to an output terminal at which the output DC voltage is presented, wherein the rectifier is not conductive in the first clock phase, the rectifier comprises a rectifying transistor having a conduction path coupled between the flying node and the ground node, and the charging of the capacitor comprises: turning on a first transistor having a conduction path coupled between the switched node and an input terminal receiving the input DC voltage, and turning on the rectifying transistor;
in the first clock phase within each of the plurality of clock periods, coupling the switched node to the ground node, comprising: turning on a second transistor having a conduction path coupled between the switched node and the ground node; and turning off the rectifying transistor; and
at start-up from a powered-down condition, generating the first and second clock phases at a frequency and duty cycle to linearly charge the capacitor to a voltage corresponding to the input voltage.

12. A method of generating an output DC voltage from an input DC voltage, comprising:
generating first and second non-overlapping clock phases over a sequence of a plurality of clock periods;
in the second clock phase within each of the plurality of clock periods, charging a capacitor from the input DC voltage, the capacitor connected between a switched node and a flying node, the flying node coupled to a ground node by a rectifier and coupled by an inductor to an output terminal at which the output DC voltage is presented, wherein the rectifier is not conductive in the first clock phase, the rectifier comprises a rectifying transistor having a conduction path coupled between the flying node and the ground node, and the charging of the capacitor comprises: turning on a first transistor having a conduction path coupled between the switched node and an input terminal receiving the input DC voltage; and turning on the rectifying transistor;
in the first clock phase within each of the plurality of clock periods, coupling the switched node to the ground node, comprising: turning on a second transistor having a conduction path coupled between the switched node and the ground node; and turning off the rectifying transistor;
sensing current conducted by one of the first and second transistors;
receiving an input corresponding to a maximum current level; and limiting a charging current applied to the flying capacitor responsive to the sensed current relative to the maximum current level.

13. The method of claim 12, wherein the turning on of the first transistor comprises:

applying a gate voltage as a trapezoidal waveform to a control terminal of the first transistor, responsive to the second clock phase.

14. The circuit of claim 12, wherein the limiting of a charging current comprises:

controlling the timing of the first and second clock phases according to a peak-current, constant frequency, and control topology.

15. The method of claim 12, wherein the limiting of a charging current comprises:

controlling the timing of the first and second clock phases according to a constant off-time control topology.

* * * * *